US012562510B2

(12) United States Patent
Mastel et al.

(10) Patent No.: US 12,562,510 B2
(45) Date of Patent: Feb. 24, 2026

(54) BUS BAR PIECE AND CLAMPING SPRING CONFIGURATION FOR A CONDUCTOR CONNECTION TERMINAL

(71) Applicant: WAGO Verwaltungsgesellschaft mbH, Minden (DE)

(72) Inventors: Rudolf Mastel, Minden (DE); Marcel Liebscher, Bad Salzuflen (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 337 days.

(21) Appl. No.: 18/213,095

(22) Filed: Jun. 22, 2023

(65) Prior Publication Data

US 2023/0335924 A1 Oct. 19, 2023

Related U.S. Application Data

(63) Continuation of application No. PCT/EP2021/086808, filed on Dec. 20, 2021.

(30) Foreign Application Priority Data

Dec. 23, 2020 (DE) ..................... 20 2020 107 531.4

(51) Int. Cl.
*H01R 4/48* (2006.01)

(52) U.S. Cl.
CPC ......... *H01R 4/4816* (2023.08); *H01R 4/4823* (2023.08)

(58) Field of Classification Search
CPC ...... H01R 4/28; H01R 4/4809; H01R 4/4846; H01R 4/4816; H01R 4/4852
See application file for complete search history.

(56) References Cited

U.S. PATENT DOCUMENTS 6,155,890 A 12/2000 Gerberding
7,238,043 B2 * 7/2007 Reibke ................ H01R 4/4821 439/441

FOREIGN PATENT DOCUMENTS

| | | | |
|---|---|---|---|
| DE | 19817925 | A1 | 10/1999 |
| DE | 102004045026 | B3 | 2/2006 |
| DE | 202007001701 | U1 | 6/2008 |
| DE | 102010034881 | A1 | 2/2012 |
| DE | 202018103699 | U1 | 10/2019 |

(Continued)

OTHER PUBLICATIONS

International Search Report dated Apr. 11, 2022 in corresponding application PCT/EP2021/086808.

*Primary Examiner* — Vanessa Girardi
(74) *Attorney, Agent, or Firm* — Muncy, Geissler, Olds & Lowe, P.C.

(57) ABSTRACT

A contact insert for a conductor connection terminal having a bus bar piece and a clamping spring having a clamping leg with a clamping edge for connecting an electrical conductor. The clamping edge of the clamping leg and the bus bar piece form a clamping point for the electrical conductor to be connected. At least two lateral webs are arranged on the clamping spring on mutually opposite sides of the clamping spring. The free ends of the lateral webs are connected to one another by a transverse web, and the lateral webs and the transverse web form a circumferentially closed aperture on the clamping spring. The bus bar piece extends between the lateral webs, at least when a clamping point is closed, and the bus bar piece passes through the circumferentially closed aperture at least twice.

16 Claims, 14 Drawing Sheets

(56) References Cited

FOREIGN PATENT DOCUMENTS

| | | | |
|---|---|---|---|
| DE | 102019109974 | A1 | 10/2020 |
| EP | 1005107 | A2 | 5/2000 |
| JP | H0963664 | A | 3/1997 |

* cited by examiner

BUS BAR PIECE AND CLAMPING SPRING CONFIGURATION FOR A CONDUCTOR CONNECTION TERMINAL

This nonprovisional application is a continuation of International Application No PCT/EP2021/086808, which was filed on Dec. 20, 2021, and which claims priority to German Patent Application No 20 2020 107 531.4, which was filed in Germany on Dec. 23, 2020, and which are both herein incorporated by reference.

BACKGROUND OF THE INVENTION

Field of the Invention

The invention relates to a contact insert for a conductor connection terminal having a bus bar piece and a clamping spring, wherein the clamping spring has a clamping leg with a clamping edge for connecting an electrical conductor, and wherein the clamping edge of the clamping leg and the bus bar piece form a clamping point for the electrical conductor to be connected.

Description of the Background Art

DE 20 2018 103 699 U1 discloses an electrical connection terminal with a spring-loaded terminal connection that is composed of a clamping spring and a bus bar. The bus bar has a retaining frame and a bus bar section, wherein the retaining frame forms a closed frame, and an electrical conductor can be inserted through an opening in the retaining frame.

SUMMARY OF THE INVENTION

It is therefore an object of the present invention to provide an improved contact insert In an exemplary contact insert, it is proposed that at least two lateral webs may be arranged on the clamping spring on mutually opposite sides of the clamping spring, wherein the free ends of the lateral webs are connected to one another by a transverse web and wherein the lateral webs and the transverse web form a circumferentially closed aperture on the clamping spring, and wherein the bus bar piece extends between the lateral webs, at least when the clamping point is closed, wherein the bus bar piece passes through the circumferentially closed aperture at least twice.

"When a clamping point is closed" can mean, in particular, that the electrical conductor cannot be inserted into the contact insert and connected at the clamping point by the clamping edge of the clamping leg. In addition, "when a clamping point is closed" can mean that an electrical conductor that has already been connected cannot be removed from the contact insert, or at least not without damaging the contact insert or the electrical conductor. The electrical conductor is therefore held on the bus bar piece by the spring force of the clamping spring when the clamping point is closed.

A "passing through at least twice" can mean, in particular, that the bus bar piece extends through the circumferentially closed aperture at two different points of the circumferentially closed aperture. The bus bar piece can therefore both enter through the circumferentially closed aperture and extend back out of the circumferentially closed aperture again.

The connected electrical conductor is secured against lateral escape by the circumferentially closed aperture and by the extension of the bus bar piece between the lateral webs. The lateral webs thus represent a lateral limitation for the connected electrical conductor.

In the case of electrical conductors with multiple strands, it is possible in this way to prevent the strands from splaying during insertion into the contact insert and, for example, from colliding with a housing of a plug-and-socket connector, in particular when the electrical conductor is installed outside the housing and the contact insert is inserted into the housing afterward.

The bus bar piece is guided between the lateral webs in this case. Consequently, the lateral webs are arranged laterally next to the bus bar piece, at least when the clamping point is closed, or the lateral webs are guided past the bus bar piece, at least when the clamping point is closed. This design makes it possible for the clamping spring to be positioned relative to the bus bar piece. When the conductor is not connected, it is possible that the clamping edge rests on the bus bar piece and the lateral webs are routed around the bus bar piece. In this case, the lateral webs can be arranged in the region of the clamping point on the clamping spring, for example.

Owing to the transverse web that connects the free ends of the lateral webs to one another, the clamping leg can be limited in its deflection in that the transverse web limits the deflection of the clamping leg. The transverse bar is thus designed as overload protection, for example.

The clamping spring can have a seating leg for seating on the bus bar piece, wherein the seating leg transitions into a spring bend and wherein the spring bend extends into the clamping leg. It is possible in this case that the clamping spring is designed to be essentially V-shaped.

The bus bar piece can be designed such that it is at least predominantly closed on its circumference.

In this way, a compact contact insert can be provided. "At least predominantly" can mean that at least a small gap between the ends of the bus bar piece is possible. In this case, the bus bar piece can be designed such that it is closed on its circumference in such a manner that a through opening formed by the circumferentially closed design is perpendicular to a conductor insertion direction. The conductor insertion direction in this case is the direction in which the electrical conductor is inserted into the contact insert toward the clamping point.

In this case, the clamping spring can be arranged in the interior region of the bus bar piece enclosed by the bus bar piece, wherein the clamping spring can be inserted into the interior region via the through opening, wherein the through opening is arranged essentially perpendicular to the conductor insertion direction.

The bus bar piece can have an opening for guiding the electrical conductor to the clamping point.

The electrical conductor can be guided through the opening in the bus bar piece to the clamping point. It is possible in this context that the electrical conductor can be clamped to the bus bar piece of the contact insert outside of a housing and the contact insert inserted into a housing afterward.

The bus bar piece can be designed as a single piece, wherein the free ends of the bus bar piece are bent over such that they rest flat against one another.

Thus, a single-piece bus bar piece can be provided for a contact insert in a simple and structurally simple way, wherein the free ends of the bus bar piece can be joined to one another integrally, for example by welding. Additional interlocking joining techniques are also possible, however. At least one free end can be designed as, for example, a contact pin or contact jack in this case.

The transverse web can be arranged behind the clamping point viewed from the conductor insertion direction. Further advantageously, the bus bar piece can extend between the lateral webs, wherein the transverse web is arranged on the side of the bus bar piece facing the clamping point. The transverse web can thus form an overload stop, in that the transverse web limits the maximum spring travel of the clamping spring.

The lateral webs can each be designed to be V-shaped or bow-like, wherein the lateral webs each project from the clamping spring in one direction, and wherein each one of the lateral webs forms an acute angle.

In this case, an angle between 0 degrees and 90 degrees inclusive (based on a 360 degree system) is possible. In this case, the bus bar piece can pass through the circumferentially closed aperture twice, wherein the bus bar piece passes through the circumferentially closed aperture before the bend viewed from the conductor insertion direction on the one hand, and passes through one more time after the bend on the other hand. The bus bar piece initially enters the circumferentially closed aperture in this way, wherein the bus bar piece exits the circumferentially closed aperture again after the bend.

In this case, tips of the bend of the relevant lateral web, or of the bow, that protrude relative to the bus bar piece can be designed as actuating sections so that the clamping point can be opened and/or closed by the actuating sections. It is also possible in this case that the actuating sections cooperate with, for example, a pushbutton element or a lever element.

It is also possible, however, that the lateral webs are designed to be V-shaped or bow-like without thereby forming an acute angle.

The lateral webs can be arranged on the clamping leg of the clamping spring to guide the electrical conductor to the clamping point. Furthermore, the lateral webs can be arranged on the free end of the clamping leg, and the lateral webs can project from the clamping leg in extension of the clamping leg.

The clamping leg of the clamping spring thus cannot escape to the side due to the lateral webs, for example. Owing to the limitation of the lateral webs, therefore, the clamping spring is guided with the bus bar piece that is guided between the lateral webs during spring deflection, wherein the probability of a malfunction of the contact insert can be reduced.

An “arranging of the lateral webs on the free end of the clamping leg” can mean, in particular, that the lateral webs are slotted, or exposed, relative to the clamping leg at the free end of said clamping leg. The free end of the clamping leg can be designed in this case as an exposed tab, wherein the lateral webs project from the free end of the clamping leg laterally next to the exposed tab.

The lateral webs can be arranged on the seating leg of the clamping spring to guide the electrical conductor to the clamping point. Furthermore, the clamping leg can be bent over toward the circumferentially closed aperture and pass through the same.

It is therefore possible to achieve, for example, an increase in the contact force in that the clamping leg bears on the transverse bar, at least when the clamping point is open and/or closed. During deflection of the clamping spring, the transverse bar must accordingly be deflected along with it, so a higher contact force can act on the electrical conductor.

A support section can be cut free from the clamping spring, wherein the support section is configured to support the seating leg of the clamping spring.

The free end of the support section, for example, can bear on the transverse bar and support it. By means of the support section, forces that arise, in particular the forces that arise on the lateral webs and transverse bar, can thus be absorbed and dissipated by the support section. It is also possible in this case that the support section bears directly on the clamping leg itself and supports it directly. The support section can be exposed from the seating leg of the clamping spring, for example.

In the region of the circumferentially closed aperture, a contact section can be cut free from the clamping spring, in particular from the seating leg, wherein the clamping leg can bear on the contact section.

The contact section serves to reinforce the clamping force in the connected state of the electrical conductor.

In this case, the contact section can extend, for example, from the transverse bar toward the circumferentially closed aperture and pass through the same at least once, wherein it is also possible for the contact section to pass through a second time. The contact force can be increased by means of the contact section, since the contact section must likewise be deflected owing to the support of the clamping leg on the contact section.

The contact section can have a second clamping edge at the free end, wherein the second clamping edge and the bus bar piece form a second clamping point for the electrical conductor to be connected. It is not necessary in this design for the clamping spring to bear on the contact section.

A second clamping edge can increase the clamping force on the electrical conductor or at least the number of contact impingements.

The lateral webs can each be bent over toward the seating leg, wherein a retaining section is arranged on the bus bar piece and/or on the seating leg and wherein at least one of the lateral webs or the transverse web is designed to be latchable with the retaining section when the clamping point is open. Furthermore, a release section can be arranged on the contact insert, wherein the release section is designed to release the latching between retaining section and lateral web or between retaining section and transverse web by application of force.

By means of the retaining section, a deflection of the clamping spring can be blocked, at least when the clamping point is open, so that the clamping spring can be held in an open position. In this case, it is possible that the contact insert can be delivered in an already preloaded state so that an electrical conductor can be inserted into the contact insert without prior actuation. In this case, an outward angled contour on the transverse bar, for example, can grip the retaining section formed as a hook so that a deflection of the clamping spring, in particular of the clamping leg, can be blocked.

The outward angled contour or the retaining section formed as a hook can be bent away, for example by means of a tool, after the connection of an electrical conductor so that a deflection of the clamping spring is no longer blocked, and the electrical conductor is thus clamped at the clamping point.

A snap-in function can be provided by the release section, wherein pressure can be exerted on the release section, for example through an inserted electrical conductor, wherein the latching between the retaining section and the lateral web or between the retaining section and the transverse web is released.

The release section can be deflected about an attachment point, for example by application of force by the electrical conductor. In the process, the retaining section on which the transverse web or the lateral webs are latched also moves, wherein the transverse web or the lateral webs experience no movement, so that the latching can be released.

In addition, the invention relates to a method for connecting an electrical conductor in an above-described contact insert. It is possible in this case that the contact insert with the electrical conductor is placed in a housing after the connecting of the electrical conductor. The housing can be designed here as, e.g., an insulating housing, in particular as an insulating housing of a plug-and-socket connector.

The indefinite article "a" should be understood as such, and not as a number. Thus, it is also possible that the contact insert according to the invention has a multiplicity of clamping springs, in particular two, three, or four clamping springs, wherein a clamping point for connecting at least one electrical conductor is also associated with each clamping spring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
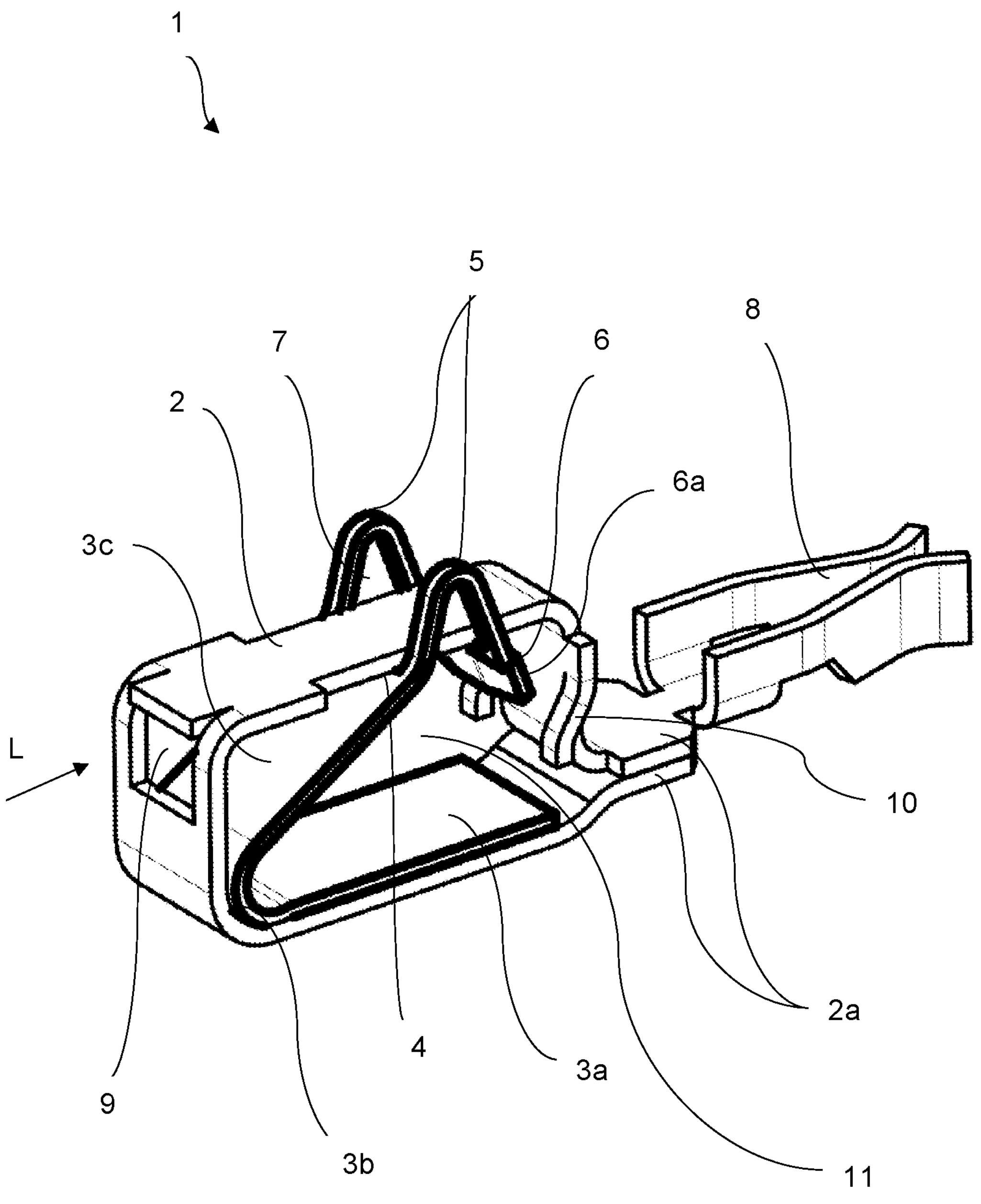
FIG. 1*a* is a contact insert in a first embodiment in a perspective view when the clamping point is closed.

FIG. 1*a* shows a contact insert 1 in a first embodiment in a perspective view. The contact insert 1 has a bus bar piece 2 and a clamping spring 3, wherein the clamping spring 3 has a seating leg 3*a* for seating on the bus bar piece 2 and wherein the seating leg 3*a* transitions into a spring bend 3*b*. The spring bend 3*b* extends into a clamping leg 3*c*. The clamping leg 3*c* has a clamping edge 4, wherein the clamping edge 4 and the bus bar piece 2 form a clamping point for an electrical conductor to be connected. The clamping point is the point at which the electrical conductor is connected to the bus bar piece 2 by the clamping edge 4 of the clamping leg 3*c*. The clamping point is closed in FIG. 1*a*.

It is clear that two lateral webs 5 are arranged to project from the free end of the clamping leg 3*c*, which is to say from the clamping edge 4, of the clamping spring 3, wherein the lateral webs project from the clamping leg 3*c* in extension of the clamping leg 3*c*. The lateral webs 5 in this case are arranged on mutually opposite sides of the clamping spring 3, wherein the free ends of the lateral webs 5 are connected to one another by a transverse web 6. In this design, the lateral webs 5 and the transverse web 6 form a circumferentially closed aperture 7 on the clamping leg 3*c* of the clamping spring 3, wherein the bus bar piece 2 extends between the lateral webs 5.

It is also evident that the lateral webs 5 are bent in a V-shape, or in a bow-like manner, and form an acute angle in the bend. In this case, the lateral webs 5 initially extend laterally past the bus bar piece 2, so that the bus bar piece 2 is arranged between the lateral webs 5, and the lateral webs 5 extend from the side of the bus bar piece 2 facing the clamping point toward the side of the bus bar piece 2 turned away from the clamping point. The lateral webs 5 thus extend away from the bus bar piece 2. On the side of the bus bar piece 2 turned away from the clamping point, the lateral webs 5 are bent back again toward the bus bar piece 2, wherein an acute angle is formed in the bend. The lateral webs 5 in this case extend back again from the side of the bus bar piece 2 turned away from the clamping points toward the side of the bus bar piece 2 facing the clamping point, wherein the transverse web 6 connects the free ends of the lateral webs 5 to one another on the side of the bus bar piece 2 facing the clamping point. The lateral webs 5 consequently extend next to the bus bar piece 2 in a bow-like manner.

It is also clear that the bus bar piece 2 passes through the circumferentially closed aperture 7 twice, wherein the bus bar piece 2 passes through the circumferentially closed aperture 7 before the bend viewed from the conductor insertion direction L on the one hand, and passes through one more time after the bend on the other hand.

It is also evident that the bus bar piece 2 is designed such that it is closed on its circumference, wherein the bus bar piece 2 is designed as a single piece and the free ends 2*a* of the bus bar piece 2 are bent over such that they rest flat upon one another. The free ends 2*a* of the bus bar piece 2 that rest flat upon one another can be integrally joined to one another in this case, for example. Arranged on one of the free ends 2*a* of the bus bar piece 2 is a contact jack 8 for connecting a contact pin. The clamping spring 3 in this case is arranged in the interior region enclosed by the bus bar piece 2, wherein the clamping spring 3 can be inserted into the interior region via the through opening, wherein the through opening is arranged essentially perpendicular to a conductor insertion direction L.

The bus bar piece 2 has an opening 9, wherein an electrical conductor can be guided through the opening 9 in the conductor insertion direction L to the clamping point. The opening 9 is arranged on the opposite side of the socket contact 8 on the bus bar piece 2 in this case.

Figure 1B:
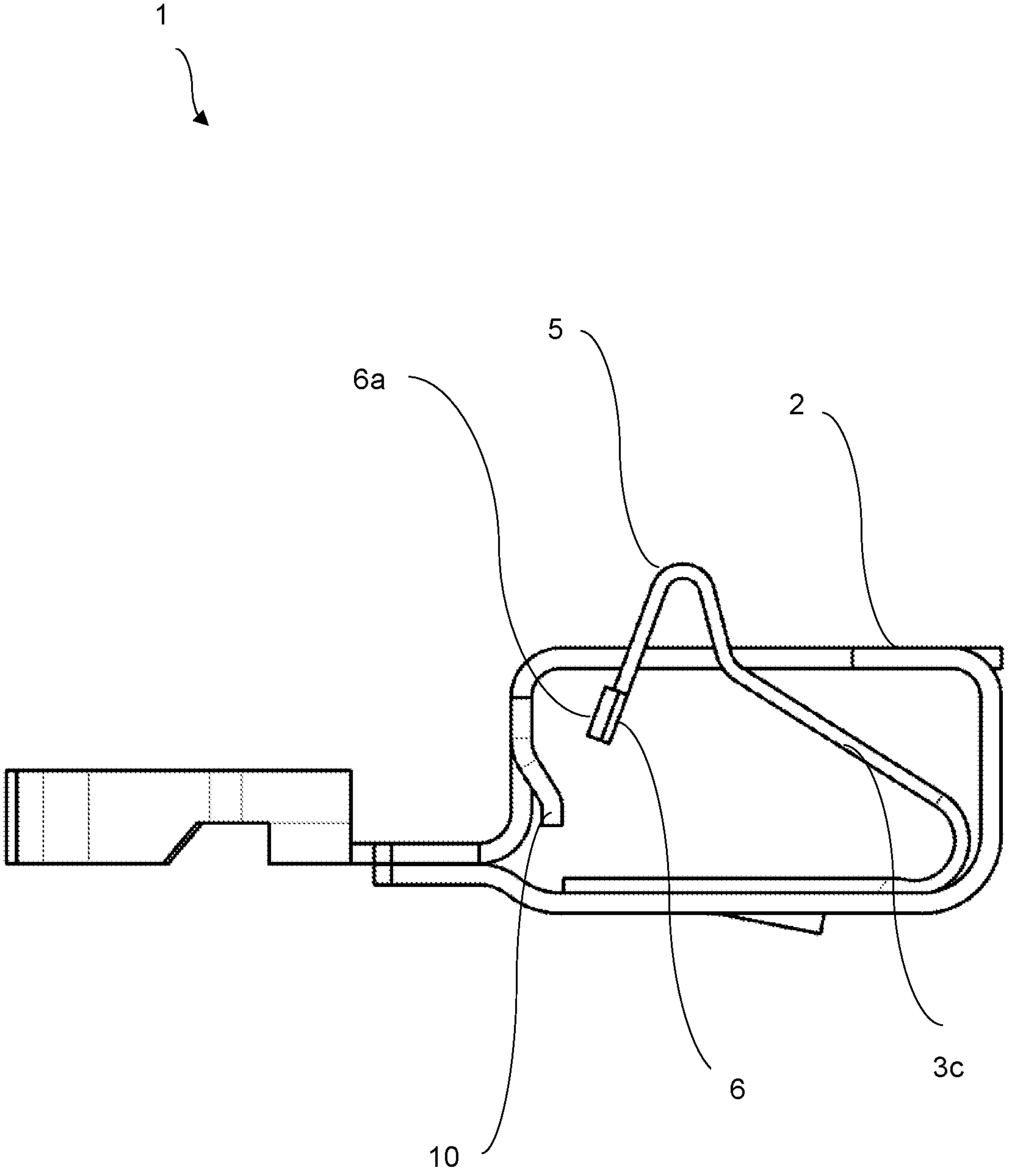
FIG. 1*b* is a contact insert from FIG. 1*a* in a side view.

FIG. 1*b* shows a contact insert 1 from FIG. 1*a* in a side view. It is evident that a retaining section 10 is freed from the bus bar piece 2. The retaining section 10 is configured to latch with the transverse web 6 when the clamping point is open. The transverse web 6 in this case has protruding sections 6*a* that are oriented laterally, for example, which is to say at right angles to the conductor insertion direction L, and that cooperate with the retaining sections 10. The contact insert 1 according to the invention can thus be placed in an already preloaded state at the factory and delivered in this state, for example. After the connecting of an electrical conductor, the retaining section 10 can be bent away, for example with a tool, by which means the clamping spring 3 is released and the electrical conductor is clamped to the bus bar piece 2.

Figure 1C:
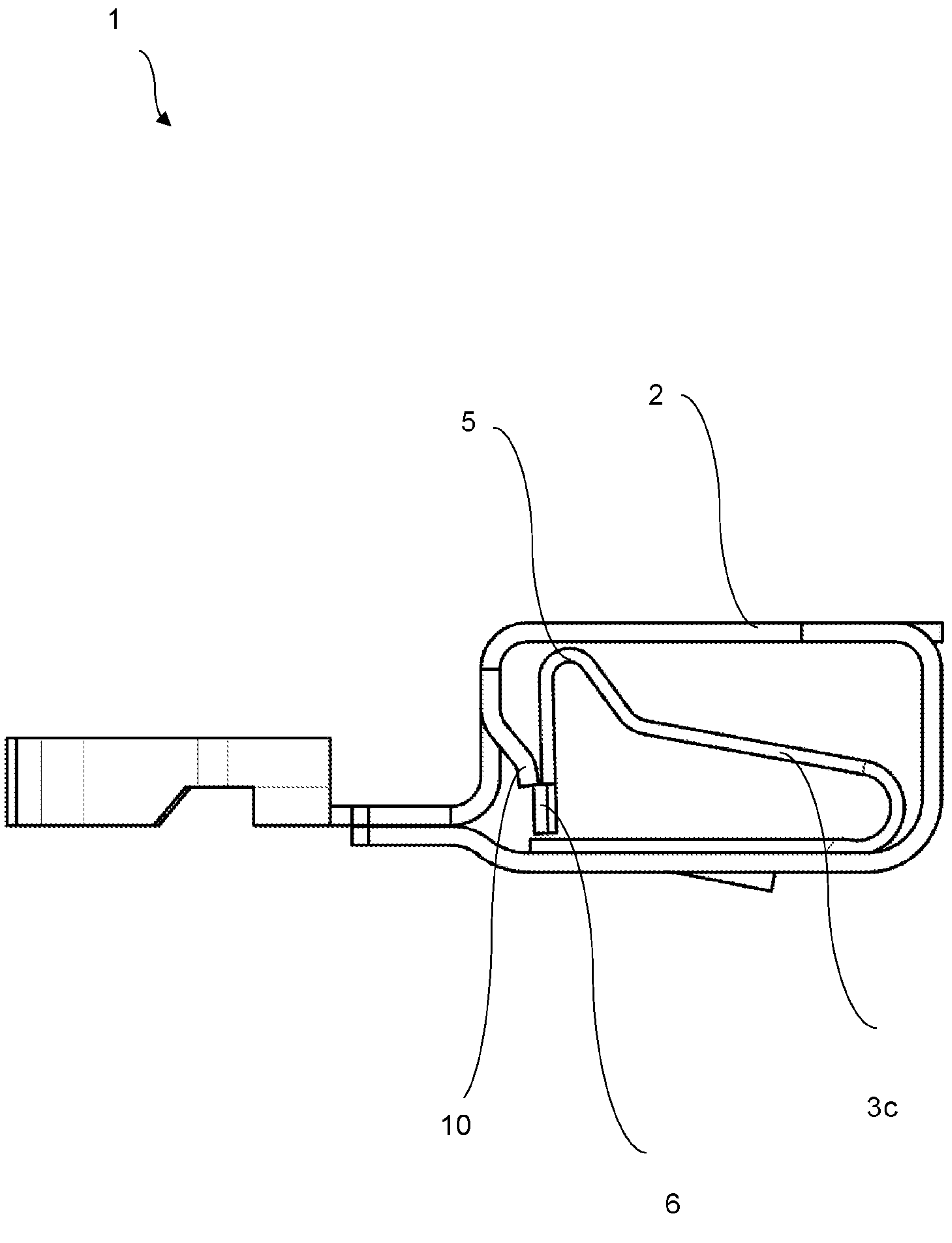
FIG. 1*c* is a contact insert from FIGS. 1*a* and 1*b* in a side view when the clamping point is open.

FIG. 1*c* accordingly shows a contact insert 1 from FIGS. 1*a* and 1*b* in a side view when the clamping point is open, wherein the transverse web 6 is latched to the retaining section 10 of the bus bar piece 2. It is evident that the retaining section 10 here is designed as outward angled hooks, wherein the outward angled hooks block a deflection of the clamping leg 3*c* when the clamping point is open.

It is clear from FIGS. 1*a* to 1*c* that the lateral webs 5 bent over in a bow-like manner during the maximum deflection of the clamping leg 3*c* of the clamping spring are only deflected far enough that the bus bar piece 2 continues to extend between the bow-like lateral webs 5. Only when the clamping point is open does the bus bar piece 2 no longer extend between the lateral webs 5. It is possible, however, for the contact insert 1 to be dimensioned such that the bus bar piece 2 extends between the lateral webs 5 even when the clamping point is open, which is to say at the maximum deflection of the clamping leg 3*c* of the clamping spring 3.

Figure 2A:
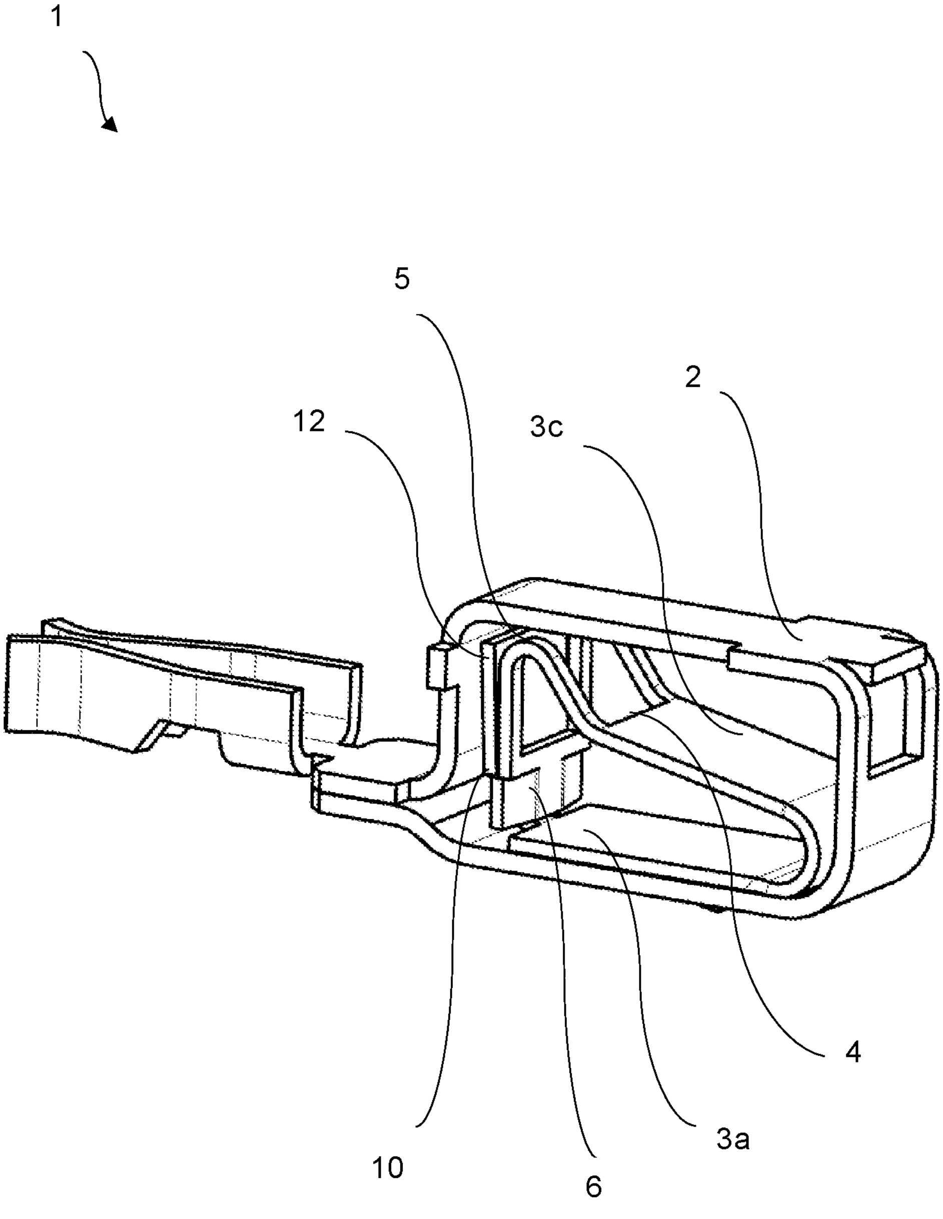
FIG. 2*a* is a contact insert in a second embodiment in a perspective view when the clamping point is open.

FIG. 2*a* shows a contact insert 1 in a second embodiment in a perspective view when the clamping point is open. FIG. 2*a* differs from the first embodiment in FIGS. 1*a* to 1*c* in that the retaining section 10 is not freed from the bus bar piece 2, but instead the retaining section 10 is formed by the seating leg 3*a* of the clamping spring 3.

Figure 2B:
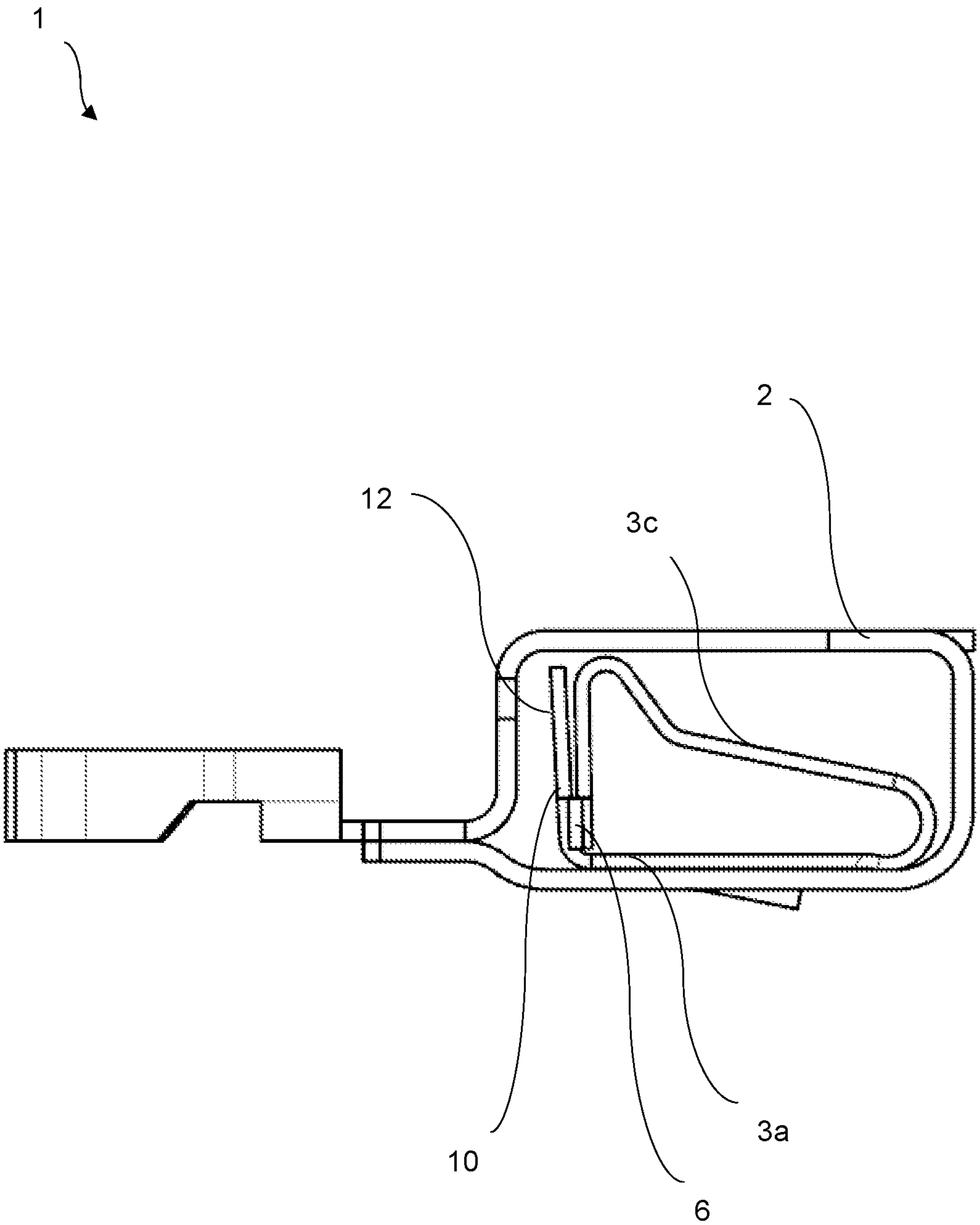
FIG. 2*b* is a contact insert from FIG. 2*a* in a side view.

FIG. 2*b* shows a contact insert 1 from FIG. 2*a* in a side view. It is clear that the transverse web 6 latches with the retaining section 10 of the seating leg so that the clamping leg 3*c* can be held when the clamping point is open.

It is also evident that a release section 12 is arranged on the seating leg 3*a*, wherein the release section 12 is configured to release the latching between the retaining section 10 and the transverse web 6. The application of force can be accomplished, for example, by insertion of an electrical conductor in that pressure is exerted on the release section 12 by the free end of the electrical conductor. The release section 12 is arranged on the free end of the seating leg 3*a* of the clamping spring 3 in this case.

Figure 2C:
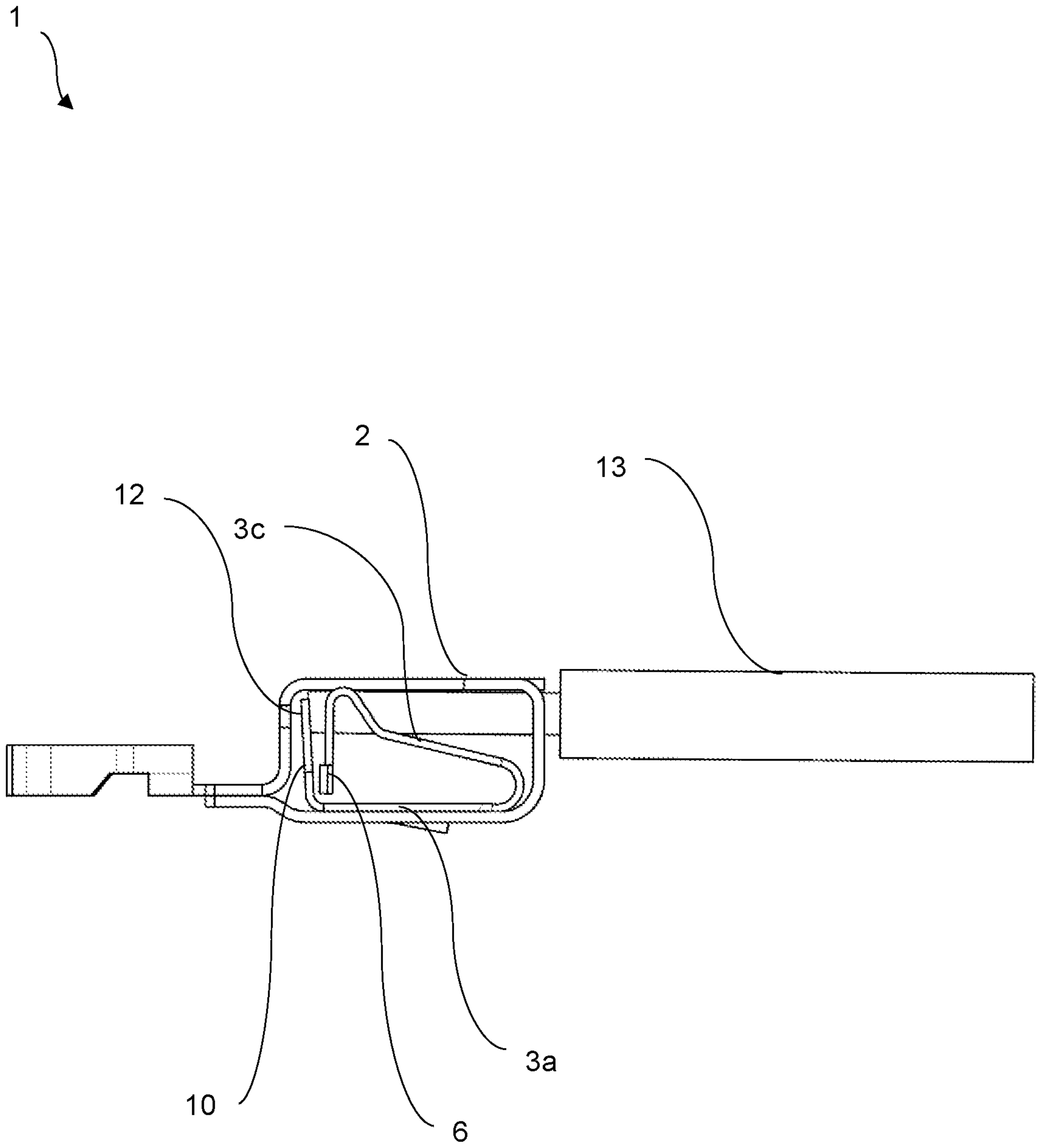
FIG. 2*c* is a contact insert from FIGS. 2*a* and 2*b* in a side view with electrical conductor inserted and clamping point closed.

FIG. 2*c* shows a contact insert 1 from FIGS. 2*a* and 2*b* in a side view with electrical conductor 13 inserted. It is clear that the latching between the retaining section 10 and the transverse web 6 is released by application of force to the release section 12, so that the clamping leg 3*c* clamps the electrical conductor 13 to the bus bar piece 2. The release section 12 can be deflected about an attachment point by application of force by the electrical conductor 13. In the process, the retaining section 10 on which the transverse web 6 or the lateral webs 5 are latched also moves, wherein the transverse web 6 or the lateral webs 5 themselves experience no movement, wherein the latching can be released. The clamping point is thus closed and the electrical conductor 13 cannot be removed from the contact insert 1 without external influences.

The second embodiment from FIGS. 2*a* to 2*c* otherwise corresponds to the first embodiment from FIGS. 1*a* to 1*c*.

Figure 3A:
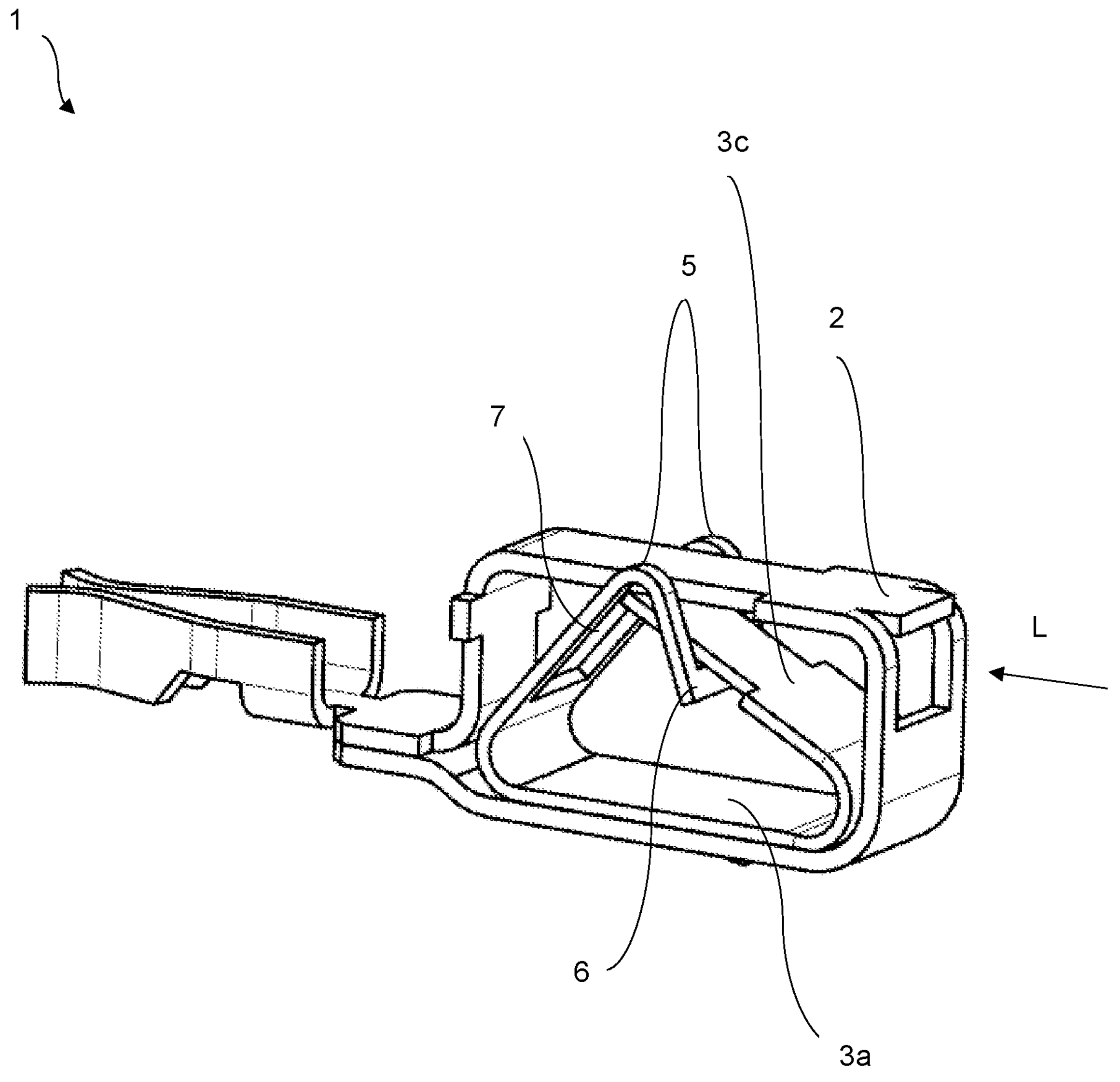
FIG. 3*a* is a contact insert in a third embodiment in a perspective view when the clamping point is closed.
Figure 3B:
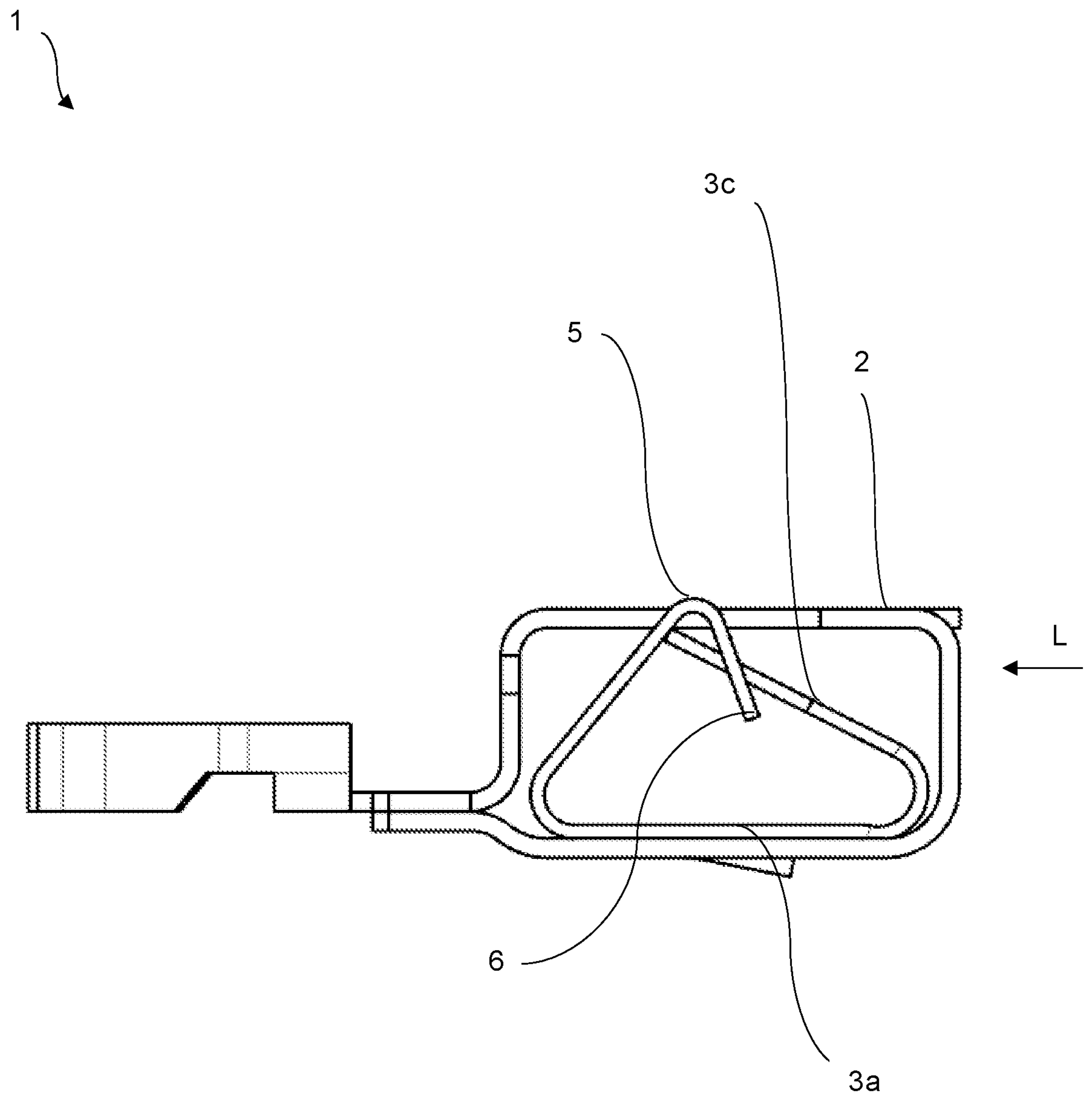
FIG. 3*b* is a contact insert from FIG. 3*a* in a side view.

FIG. 3*a* shows a contact insert 1 in a third embodiment in a perspective view when the clamping point is closed, wherein FIG. 3*b* shows a contact insert 1 from FIG. 3*a* in a side view. In contrast to the first embodiment from FIGS. 1*a* to 1*c* and the second embodiment from FIGS. 2*a* to 2*c*, it is clear that the lateral webs 5 do not project from the clamping leg 3*c*. The lateral webs 5 instead project from the free end of the seating leg 3*a*, wherein the free ends of the lateral webs 5 are connected to one another by the transverse web 6, and a circumferentially closed aperture 7 is formed on the clamping spring.

It is also evident that the lateral webs 5 are bent in a V-shape, or in a bow-like manner, and form an acute angle in the bend. In this case the lateral webs 5 extend initially in extension of the seating leg 3*c*, away from the seating leg 3*a* toward the bus bar piece 2, so that the bus bar piece 2 is arranged between the lateral webs 5. The lateral webs 5 are then bent back toward the seating leg 3*a*.

It is clear that the clamping leg 3*c* passes through the circumferentially closed aperture 7 at least once before the bend of the lateral webs 5 viewed from the conductor insertion direction. It is also possible here for the clamping leg 3*c* to pass through the circumferentially closed aperture 7 twice, namely once before the bend of the lateral webs 5 and once after the bend of the lateral webs 5.

The clamping leg 3*c* in this case can rest against the transverse bar 6 with the electrical conductor inserted, at least when the clamping point is open and/or when the clamping point is closed, by which means the contact force can be increased. Owing to the support of the clamping leg 3*c* on the transverse bar 6, the transverse bar 6 must likewise be deflected.

Furthermore, in contrast to the first and second embodiments from FIGS. 1*a* to 2*c*, neither a retaining section 10 nor a release section 12 is arranged here. Otherwise, the third embodiment corresponds to FIGS. 2*a* to 2*b*.

Figure 4A:
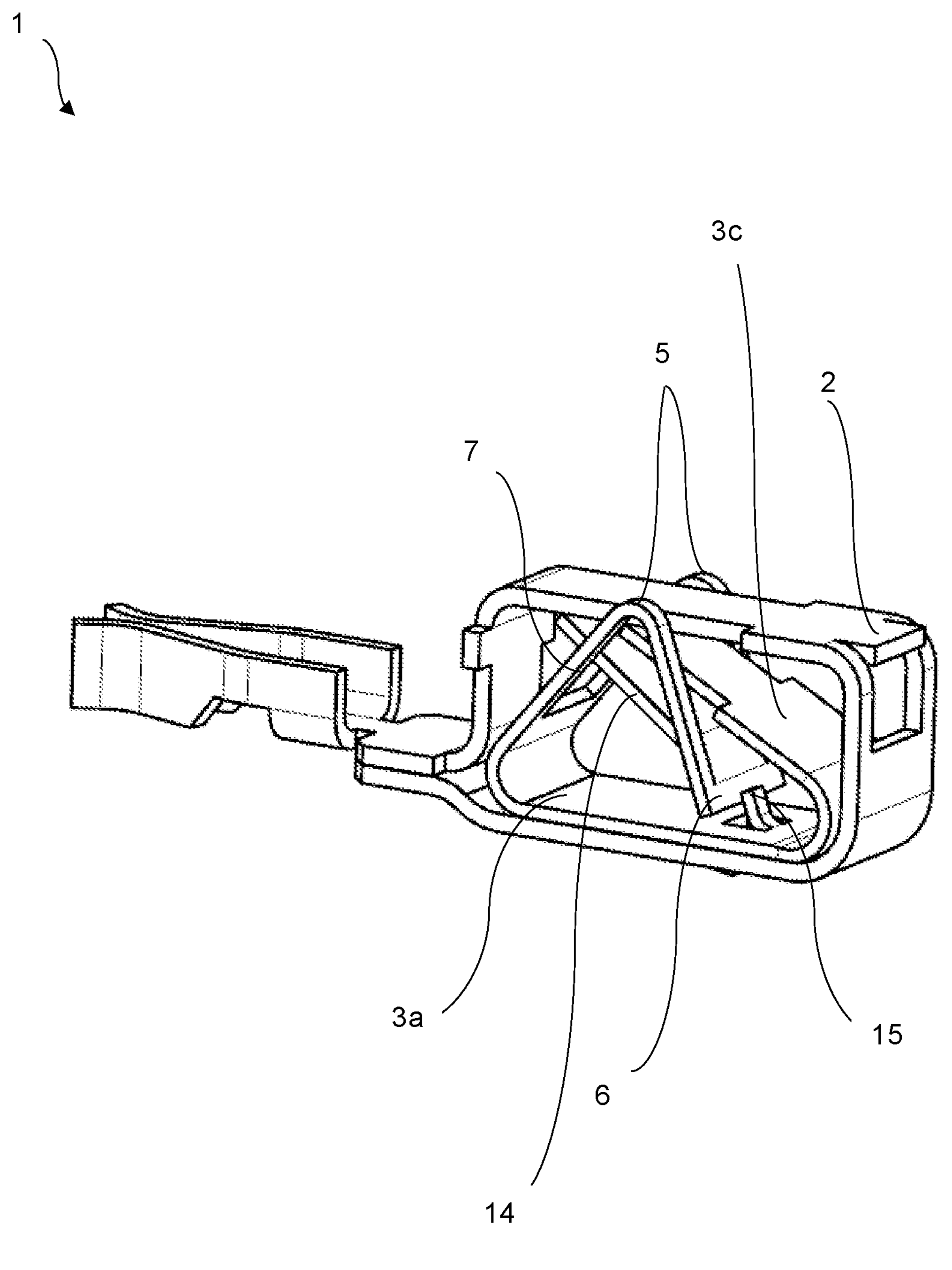
FIG. 4*a* is a contact insert in a fourth embodiment in a perspective view when the clamping point is closed.
Figure 4B:
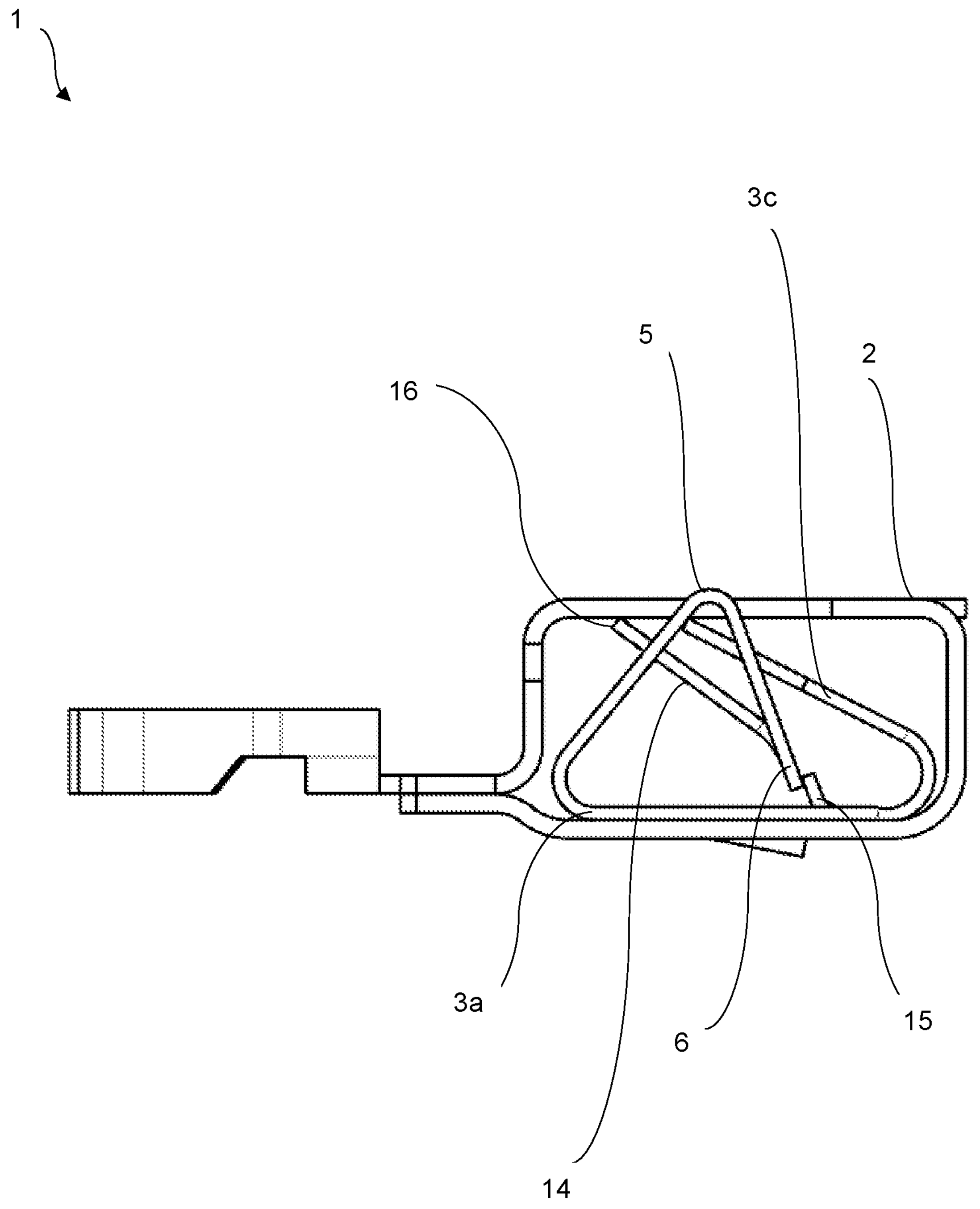
FIG. 4*b* is a contact insert from FIG. 4*a* in a side view.

FIG. 4*a* shows a contact insert 1 in a fourth embodiment in a perspective view when the clamping point is closed, wherein FIG. 4*b* shows a contact insert 1 from FIG. 4*a* in a side view. In contrast to the fourth embodiment from FIGS. 3*a* and 3*b*, a contact section 14 is exposed on the transverse bar 6 in the region of the circumferentially closed aperture 7*a*. The contact section 14 extends in this case from the transverse bar 6 toward the circumferentially closed aperture 7*a* and passes through the same at least once, wherein it is possible for the contact section 14 to pass through a second time.

It is clear that the clamping leg 3*c* bears on the contact section 14, wherein the contact force can be increased since the contact section must likewise be deflected owing to the support of the clamping leg 3*c* on the contact section 14.

Owing to the exposed contact section 14, it can be advantageous to support the seating leg 3*c* by means of a support section 15. In the fourth embodiment from FIGS. 4*a* and 4*b*, the support section 15 is cut free from the seating leg 3*a* of the clamping spring 3, wherein the free end of the support section 15 bears on the transverse bar 6 and supports it. By means of the support section 15, forces that arise, in particular the forces that arise on the lateral webs 5 and transverse bar 6, can thus be absorbed and dissipated by the support section 15. It is also possible in this case that the support section 15 bears directly on the clamping leg 3*c* itself and supports it directly.

It is also evident that a second clamping edge 16 is arranged at the free end of the contact section 14, wherein the second clamping edge 16 and the bus bar piece 2 form a second clamping point for the electrical conductor to be connected. In this way, the clamping force on the electrical conductor or at least the number of contact impingements can be further increased, and the connected electrical conductor held in its position. The second clamping edge 16 can also be designed to be independent of the bearing of the clamping leg 3*c* on the contact section 14.

The fourth embodiment from FIGS. 4*a* and 4*b* otherwise corresponds to the third embodiment from FIGS. 3*a* and 3*b*.

Figure 5A:
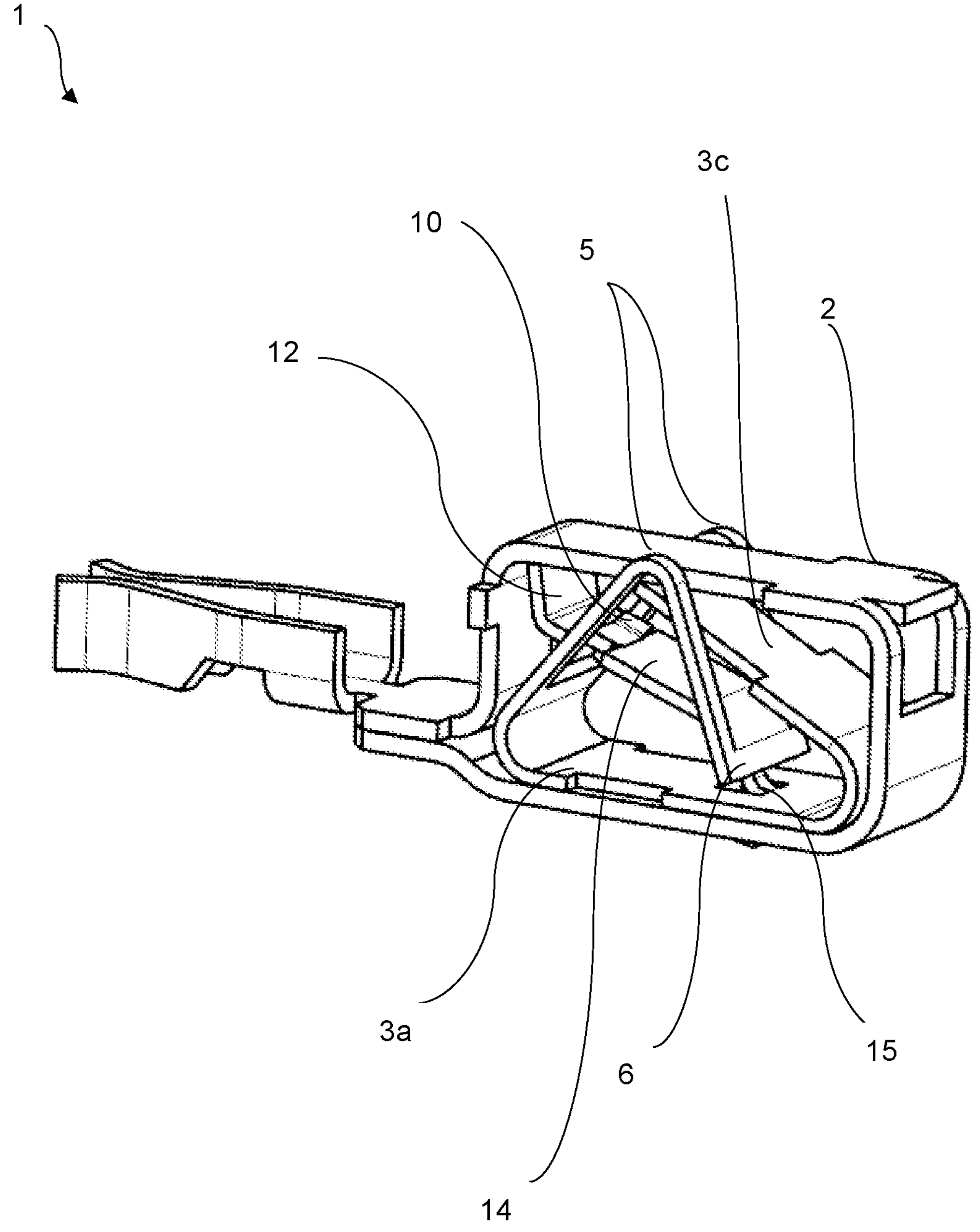
FIG. 5*a* is a contact insert in a fifth embodiment in a perspective view when the clamping point is closed.
Figure 5B:
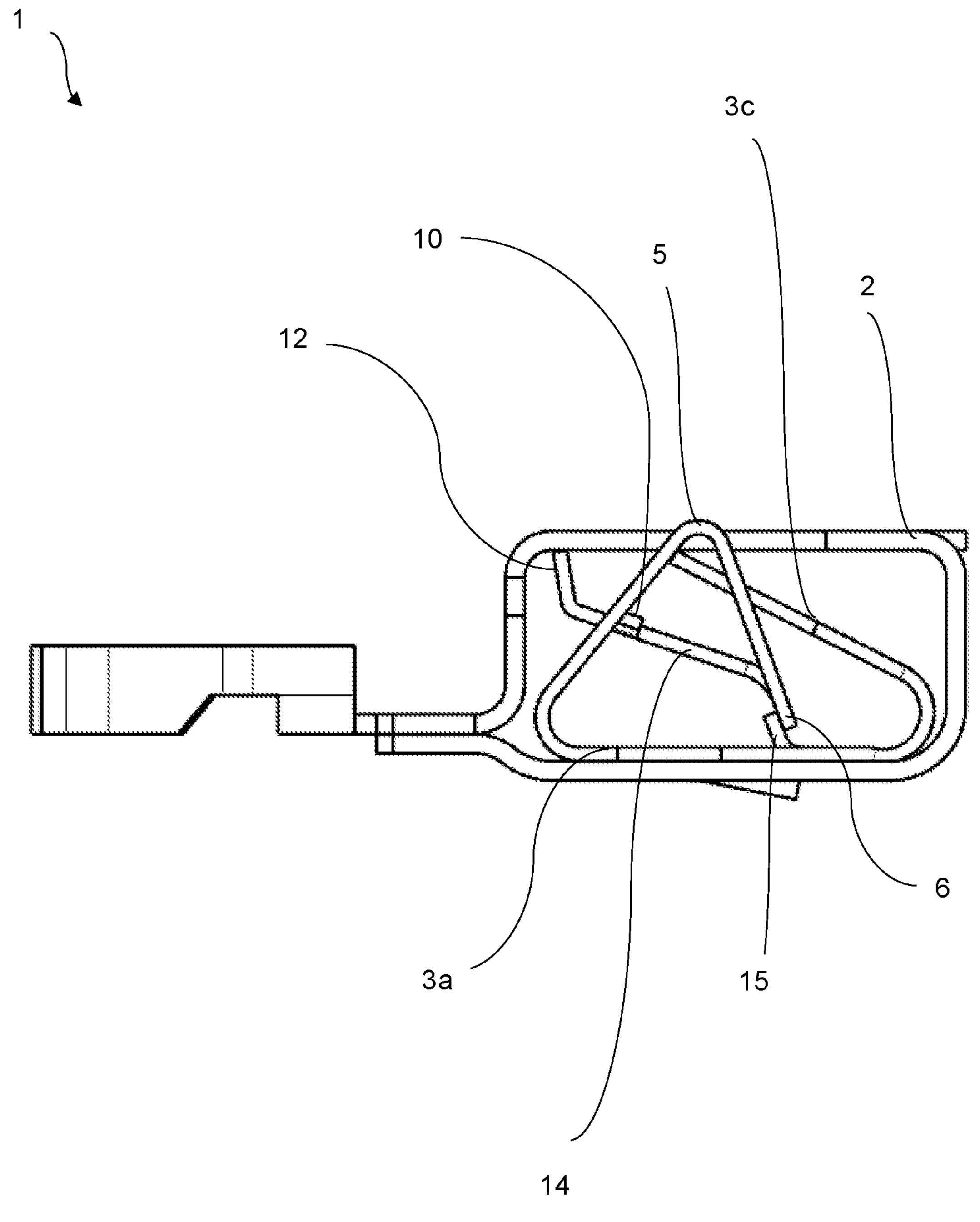
FIG. 5*b* is a contact insert from FIG. 5*a* in a side view.

FIG. 5*a* shows a contact insert 1 in a fifth embodiment in a perspective view when the clamping point is closed, wherein FIG. 5*b* shows a contact insert 1 from FIG. 5*a* in a side view. In contrast to the fourth embodiment from FIGS. 4*a* and 4*b*, a retaining section 10 is arranged on the contact section 14 in the fifth embodiment, wherein the retaining section 10 is designed as protruding claws. It is also possible for the retaining section 10 to be designed as a hook.

Figure 5C:
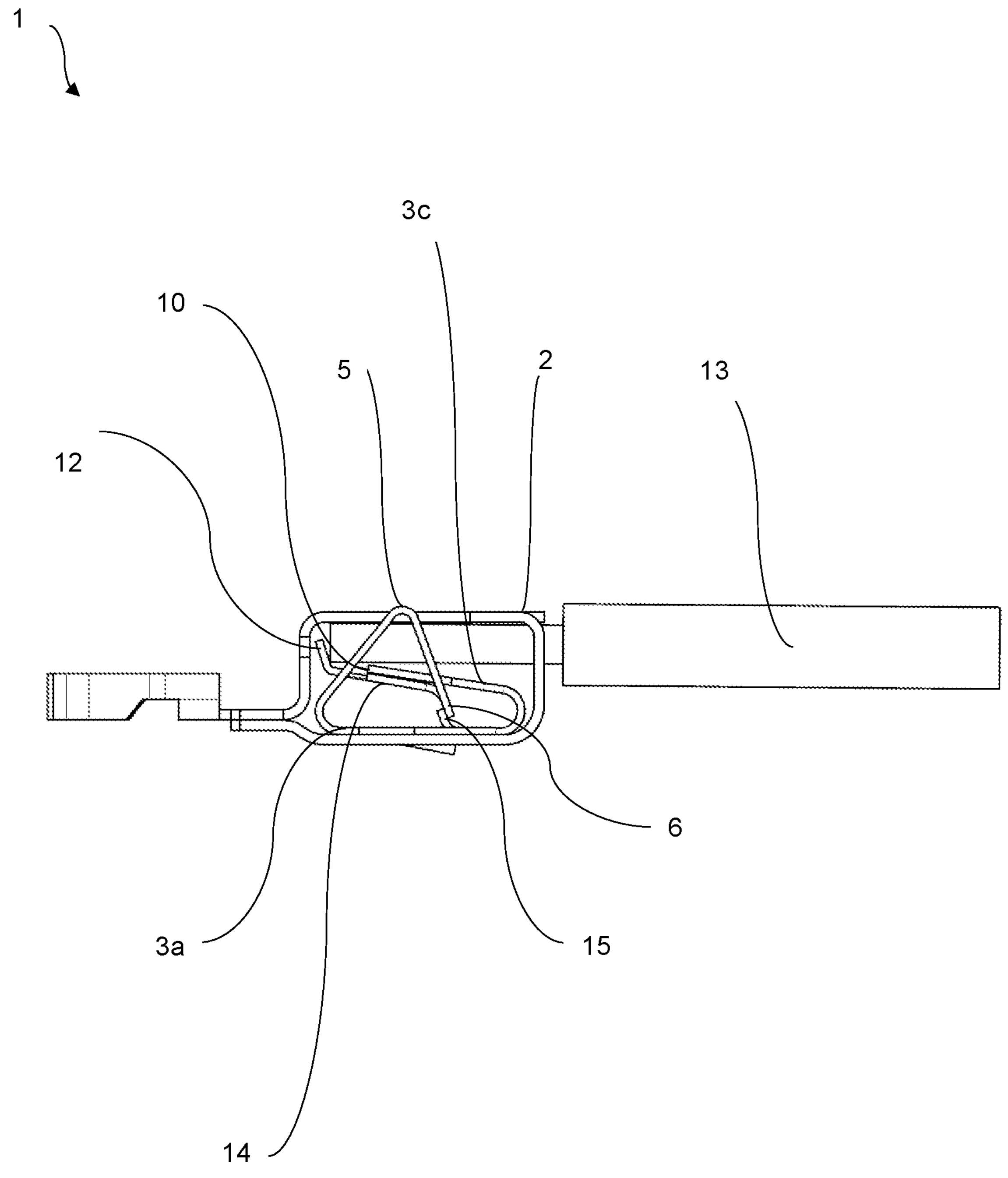
FIG. 5*c* is a contact insert from FIGS. 5*a* and 5*b* in a side view with an inserted electrical conductor when the clamping point is open.

FIG. 5*c* shows a contact insert from FIGS. 5*a* and 5*b* in a side view with an inserted electrical conductor 13 when the clamping point is open. It is clear that the clamping leg 3*c* is designed for latching with the retaining section 10 of the contact section 14, wherein the clamping leg 3*c* can be held in this way when the clamping point is open and the electrical conductor 13 can be inserted into the contact insert 1.

Figure 5D:
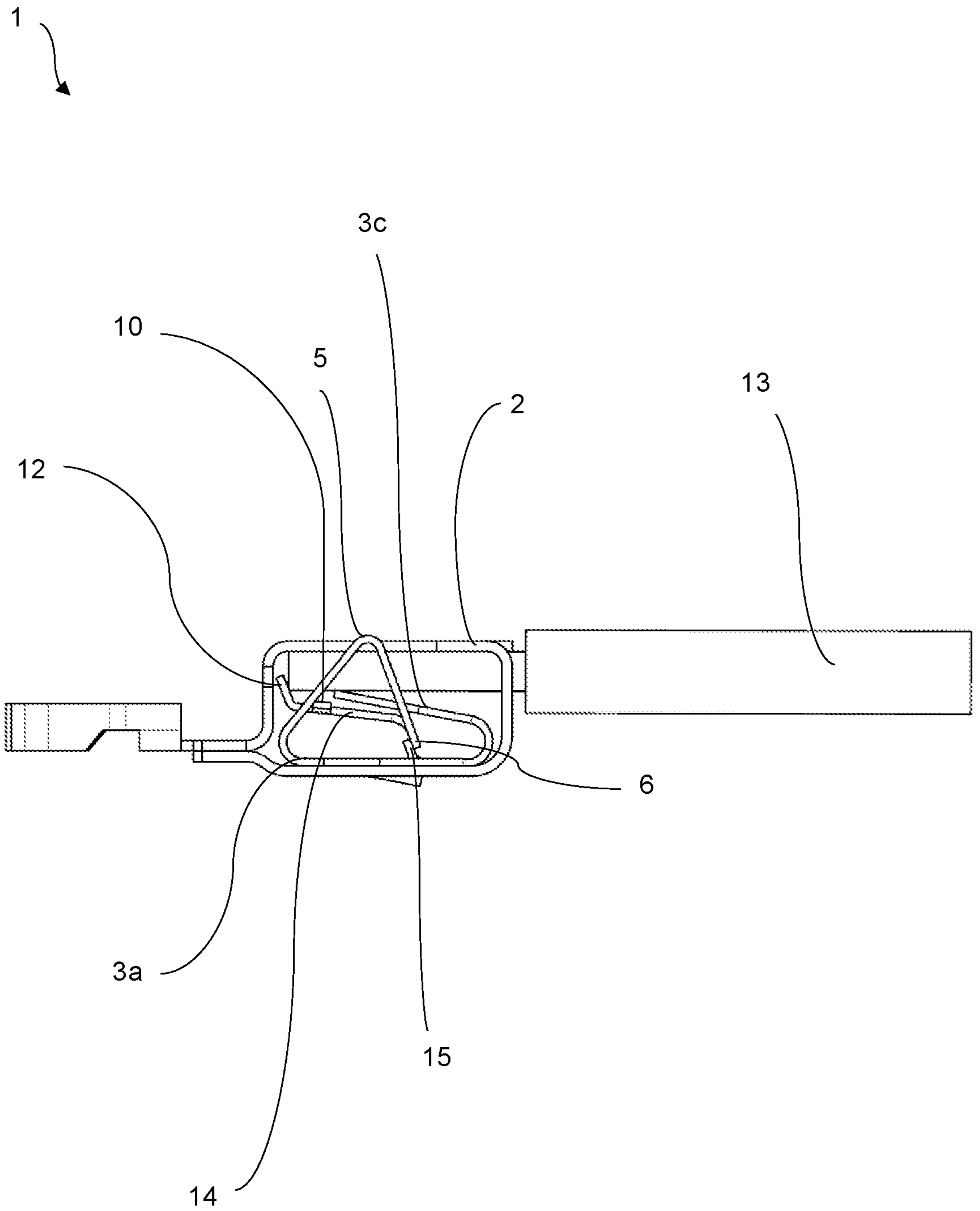
FIG. 5*d* is a contact insert from FIGS. 5*a* to 5*c* in a side view with an inserted electrical conductor when the clamping point is closed.

FIG. 5*d* shows a contact insert from FIGS. 5*a* to 5*c* in a side view with an inserted electrical conductor when the clamping point is closed. It is clear that a release section 12 is arranged on the free end of the contact section 14, wherein the latching between retaining section 10 and the clamping leg 3*c* is released by application of force to the release section 12 by the free end of the electrical conductor 13, and the electrical conductor 13 is thus clamped to the bus bar 2.

The fifth embodiment from FIGS. 5*a* to 5*d* otherwise corresponds to the fourth embodiment from FIGS. 4*a* and 4*b*.

A connecting of electrical conductors can take place with a method for connecting the electrical conductor in an above-described contact insert 1 according to the embodiments from FIGS. 1*a* to 5*d*. It is possible in this case that the contact insert with the electrical conductor is placed in a housing after the connecting of the electrical conductor. The housing can be designed here as, e.g., an insulating housing, in particular as an insulating housing of a plug-and-socket connector.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A contact insert for a conductor connection terminal, comprising:

a bus bar piece; and a clamping spring having a clamping leg with a clamping edge to connect an electrical conductor, the clamping edge of the clamping leg and the bus bar piece forming a clamping point for the electrical conductor to be connected; and at least two lateral webs arranged on the clamping spring on mutually opposite sides of the clamping spring, free ends of the lateral webs being connected to one another by a transverse web, wherein the lateral webs and the transverse web form a circumferentially closed aperture on the clamping spring, wherein the bus bar piece extends between the lateral webs, at least when the clamping point is closed, wherein the bus bar piece passes through the circumferentially closed aperture at least twice, and wherein the lateral webs are designed to be V-shaped, wherein the lateral webs project from the clamping spring in one direction and wherein the lateral webs each form an acute angle.

2. The contact insert according to claim 1, wherein the bus bar piece is designed so as to be at least predominantly closed on a circumference thereof.

3. The contact insert according to claim 1, wherein the bus bar piece has an opening for guiding the electrical conductor to the clamping point.

4. The contact insert according to claim 1, wherein the bus bar piece is designed as a single piece, wherein free ends of the bus bar piece are bent over such that the free ends rest flat against one another.

5. The contact insert according to claim 1, wherein the transverse web is arranged behind the clamping point viewed from a conductor insertion direction.

6. The contact insert according to claim 1, wherein when the bus bar piece extends between the lateral webs, the transverse web is arranged on a side of the bus bar piece facing the clamping point.

7. The contact insert according to claim 1, wherein the lateral webs are arranged on the clamping leg of the clamping spring to guide the electrical conductor to the clamping point.

8. The contact insert according to claim 7, wherein the lateral webs are arranged on a free end of the clamping leg, and wherein the lateral webs project from the clamping leg in an extension of the clamping leg.

9. The contact insert according to claim 1, wherein the clamping spring has a seating leg for seating on the bus bar piece, wherein the seating leg transitions into a spring bend, and wherein the spring bend extends into the clamping leg.

10. The contact insert according to claim 9, wherein the lateral webs are arranged on the seating leg of the clamping spring.

11. The contact insert according to claim 10, wherein the clamping leg is bent over toward the circumferentially closed aperture and passes through the circumferentially closed aperture.

12. The contact insert according to claim 10, wherein a support section is cut free from the clamping spring, wherein the support section is configured to support the seating leg of the clamping spring.

13. The contact insert according to claim 10, wherein a contact section is cut free from the clamping spring in a region of the circumferentially closed aperture, and wherein the clamping leg bears on the contact section.

14. The contact insert according to claim 13, wherein the contact section has a second clamping edge at a free end thereof, wherein the second clamping edge and the bus bar piece form a second clamping point for the electrical conductor to be connected.

15. The contact insert according to claim 9, wherein the lateral webs are bent over toward the seating leg, wherein a retaining section is arranged on the bus bar piece and/or on the seating leg, and wherein at least one of the lateral webs or the transverse web is designed to be latchable with the retaining section at least when the clamping point is open.

16. The contact insert according to claim 15, wherein a release section is arranged on the contact insert, wherein the release section is designed to release the latching between the retaining section and the at least one of the lateral webs or between the retaining section and the transverse web by application of force.

* * * * *